United States Patent Office 3,439,480
Patented Apr. 22, 1969

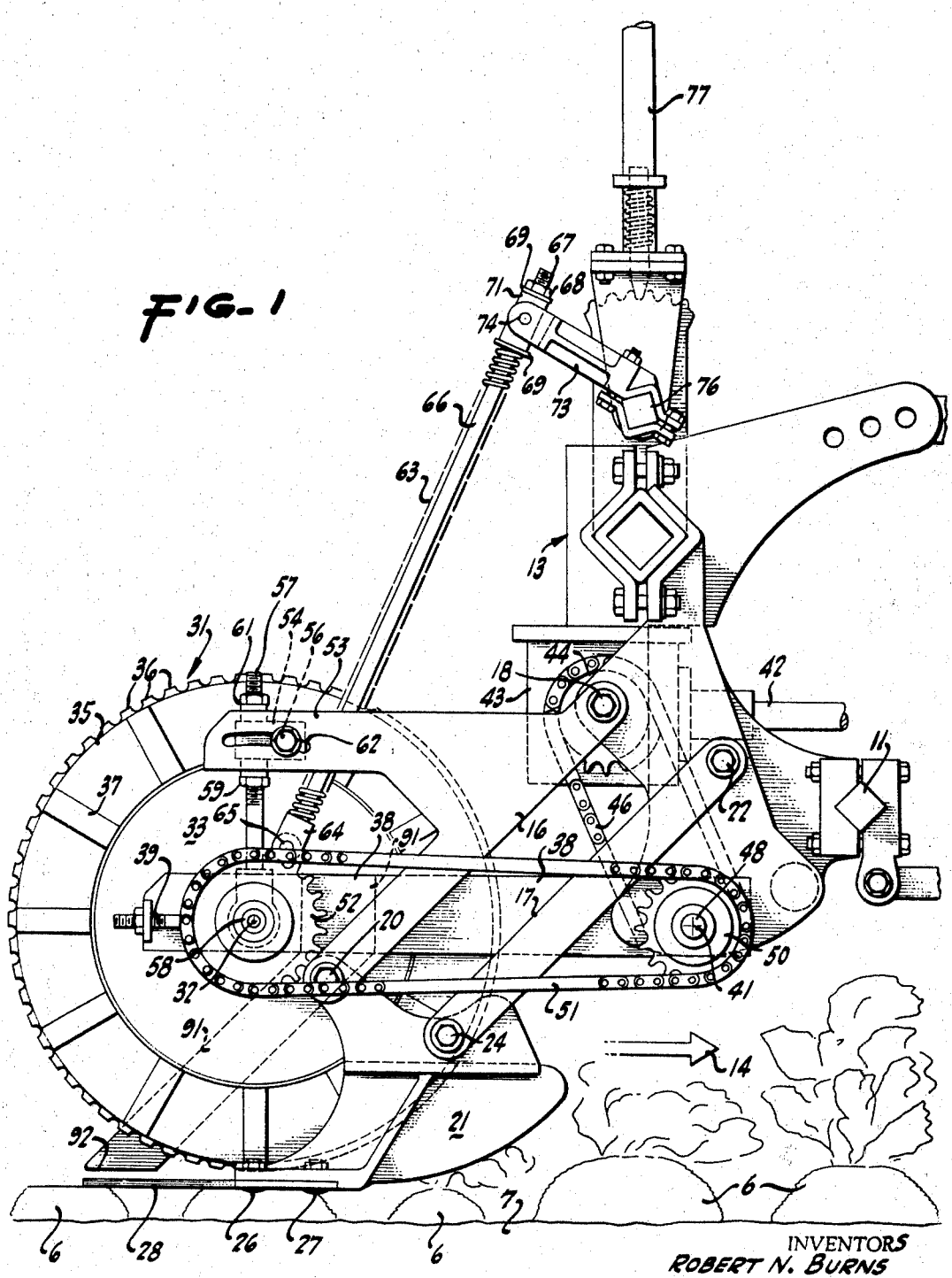

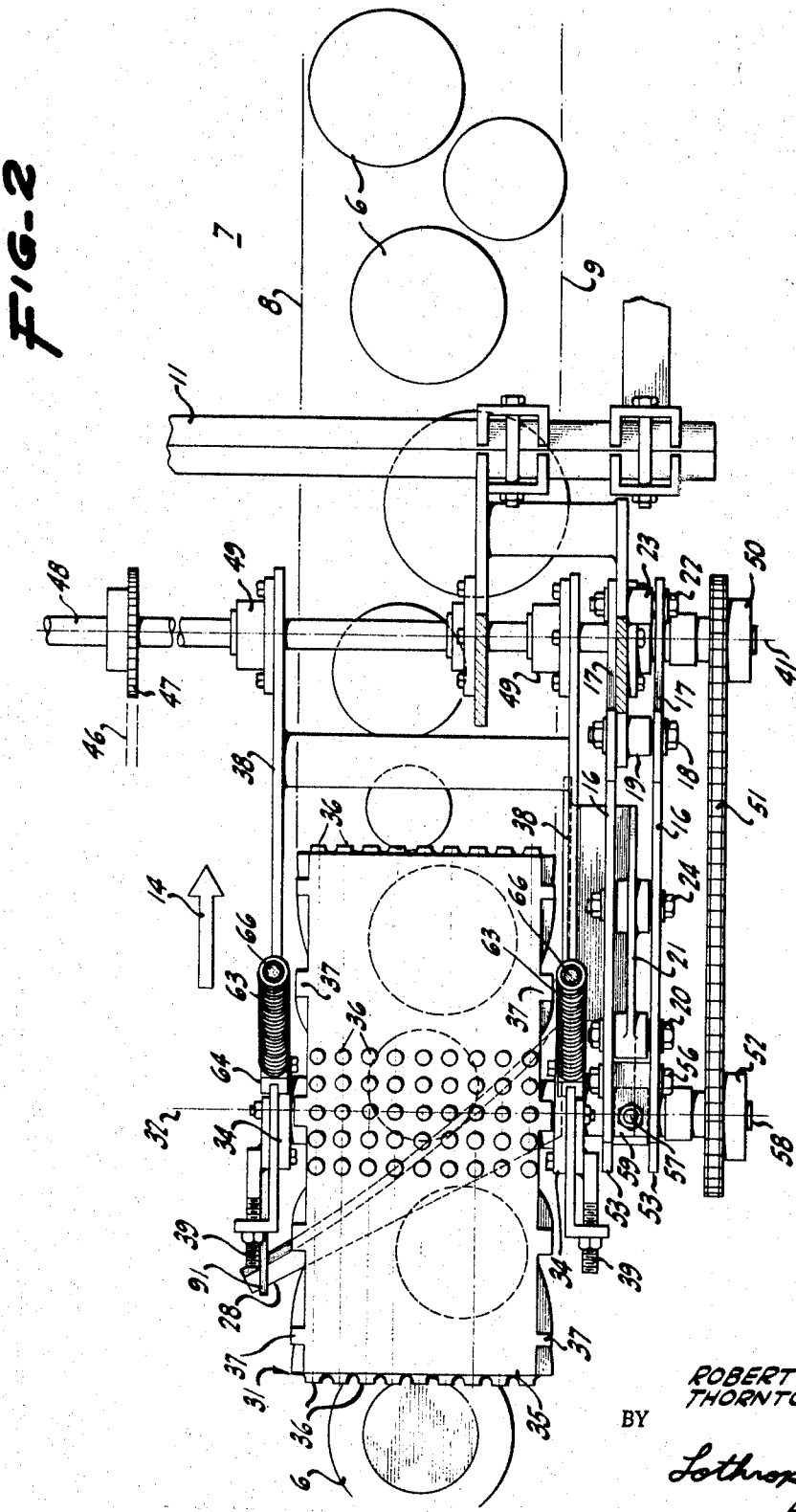

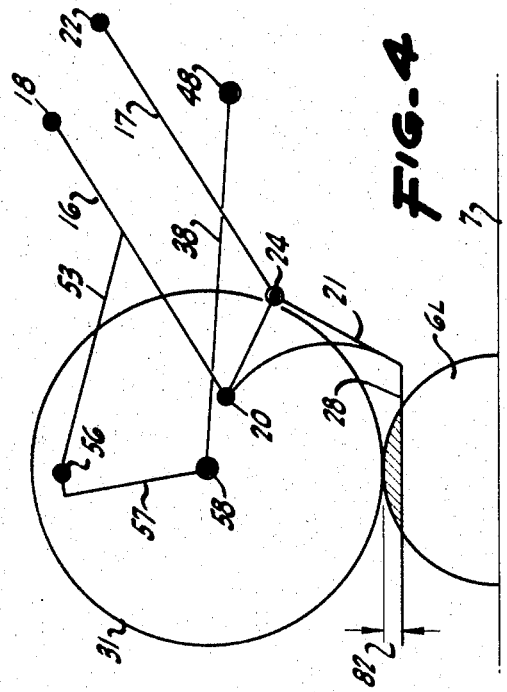
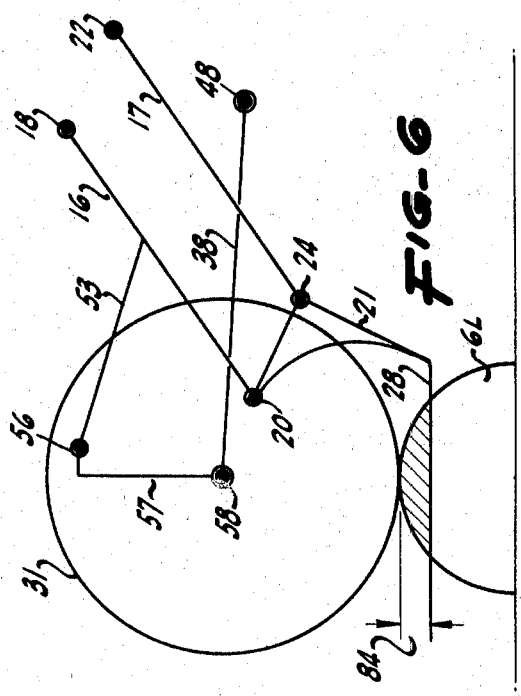
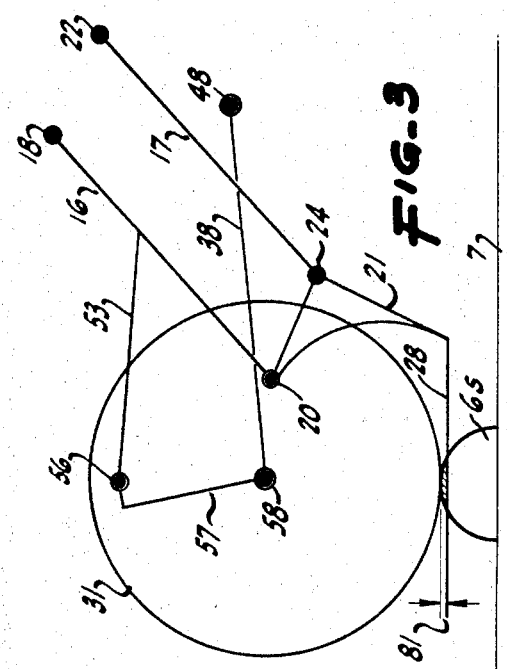
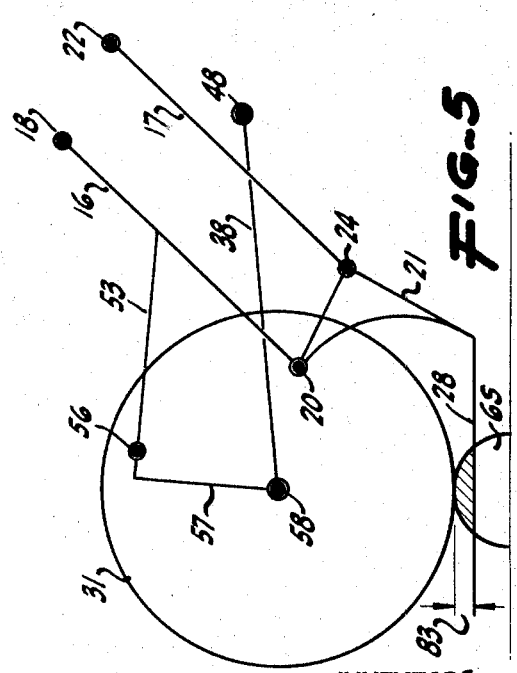
INVENTORS
ROBERT N. BURNS
THORNTON E. WULF
BY
Lothrop & West
ATTORNEYS

---

3,439,480
BEET TOPPER
Robert N. Burns and Thornton E. Wulf, Boise, Idaho, assignors to Western Conveyor Company, a corporation of Idaho
Filed Apr. 15, 1966, Ser. No. 543,425
Int. Cl. A01d *23/02*
U.S. Cl. 56—121.4                           1 Claim

ABSTRACT OF THE DISCLOSURE

A beet topper for advance over a row of beets has a parallelogram linkage mounting a cutting knife and connected to the main frame of the beet topper. A beet-engaging wheel on the linkage is circular cylindrical in shape, is about as wide as the beets in the row and has radially extending fins projecting axially from the wheel sides to acts as sweeps for dislodging debris from the adjacent parts of the beet topper.

---

Our invention relates generally to machines for use in a field containing growing vegetables; for example, sugar beets or the like, generally planted in rows. The machine removes the top portions of the growing vegetables prior to an operation removing the vegetables from the ground. In the usual culture of vegetables, for example, sugar beets, the beets are planted in a field in rows laterally spaced apart a selected distance. The beets themselves are more or less in a straight line although they vary considerably from an ideal position because of planting variation and because of variations in growth. The ideal line of beets is actually more like a band of beets. Also, the beets grow to varying heights and diameters. Prior to harvesting the beets, or beet roots, it is customary to remove the tops therefrom. This is usually done in any one of several ways. A principal way is to sever or cut the top portion of the beet root and to displace it so as to remove the foliage and the severed top portion of the root and to leave the remaining portion of the root implanted in the ground. While the severed tops may have some value, the principal crop is the beet root. It is desirable to reserve or hold as much of the beet root as possible in the ground and to remove as little as possible of the top portion with the foliage. The optimum amount to be severed depends upon several factors and varies partly in accordance with the amount of protrusion of the vegetable above the surrounding ground surface and partly in accordance with the size of the individual plant.

It is therefore an object of our invention to provide a beet topper which can be utilized in connection with conventionally grown beets and which will be effective to sever or cut off the tops of the growing plants in such a fashion as to preserve a large part of the root and to remove only a small amount of the root.

Another object of the invention is to provide a beet topper effective to top beets despite wide variations in the growing location and size of the beets and the amount of their protrusion above the surrounding ground.

Another object of the invention is to provide a beet topper which automatically will sever a relatively small amount from the top of the root of a small beet and a relatively larger amount from the top of the root of a larger beet.

Another object of the invention is to provide a beet topper having a setting or adjustment so that the amount of beet root to be removed may be selected and so that the ratio of the amount of beet root to be removed is likewise selectable.

A further object of the invention is to provide a beet topper having a beet-engaging, finger wheel which will accurately follow the configuration and contour of beets growing in the row.

Another object of the invention is to provide means for precluding any interference between the beet root severing knife and the finder wheel.

Another object of the invention is in general to provide an improved beet topper.

Other objects together with the foregoing are attained in the embodiment of the invention described in the accompanying description and illustrated in the accompanying drawings, in which:

FIGURE 1 is a side elevation of a beet topper constructed in accordance with our invention and arranged in connection with a support and propelling vehicle and shown in the act of severing beet root tops;

FIGURE 2 is a plan of the structure shown in FIGURE 1; and

FIGURES 3, 4, 5 and 6 are diagrammatic views showing in side elevation the relationship of the topper parts under different conditions of the beet topping operation.

While the beet topper of the invention can be applied and embodied in a number of different ways, it is customarily arranged for use in a field in which beets 6 are planted generally in a longitudinal row and in which the beets project above the surface of the surrounding ground 7. The beets are of random size and random height above the ground, and while they are generally planted as nearly as possible in a straight line or a narrow row, in fact they are distributed laterally and as they grow and develop tend to depart from a strictly linear relationship. The actual beet row has an envelope roughly demarked by outside boundary lines 8 and 9. These define in effect a band or path within which the beets to be topped are located. As indicated in FIGURE 1 and in FIGURES 3–6, some of the beets, such as the smaller beet 6S of FIGURES 3 and 5, project a relatively small amount above the surface of the ground 7 whereas other beets 6L, as in FIGURES 4 and 6, extend substantially higher above the surface of the surrounding ground 7.

In order properly to top all of the beets in the row, there is provided a beet topper designed to be mounted on a hitch frame 11 of any suitable tractor. The details of the tractor and of the hitch frame are standard and well known and are not illustrated in detail. The beet topper itself includes a topper main frame 13 comprised of a number of parts and is fastened appropriately to the hitch frame. The main frame 13 is supported on and advanced by the tractor in the direction of the arrow 14 along the beet row.

While but one row of beets can be topped at a time, it is usually the case that a number of rows are simultaneously harvested by the provision of duplicate topping mechanisms arranged side by side on the hitch frame. Since each topper unit is an exact duplicate of the others, only a single beet topper is disclosed herein. On the topper main frame 13 there are mounted twin parallelogram linkages. Each includes an upper link 16 and a lower link 17 disposed generally in the same vertical plane extending longitudinally of the structure parallel to the direction 14 of advance and mounted for pivotal movement about transverse horizontal axes. For example, the upper links 16 at their upper end engage a transverse pivot pin 18 mounted in a boss 19 forming part of the main frame 13. At their lower ends, the upper link 16 engage a comparable pivot pin 20 also engaging an intervening knife frame 21. Similarly, the lower parallelogram links 17 at their upper end have a transverse pivot pin 22 mounted in a boss 23 forming part of the main frame 13. At their lower end the lower links 17 engage a parallel mounting pin 24 extending from the knife frame 21. With this arrangement, the knife frame 21 can be raised and lowered with respect to the main frame 13, the parts of the knife frame always remaining parallel to themselves.

Mounted on the knife frame by detachable fasteners 26 and 27 is a topping knife 28. This is a relatively flat, horizontal blade and extends diagonally across the lane or path of the beets 6, spanning the entire distance between the side lines 8 and 9. The knife can be of various shapes and is readily replaced from time to time with other styles of knives. In every instance the knife is sharpened along its leading edge so as to encounter and sever the top portion of any of the beet roots 6 which happen to be in its path.

As part of the mechanism for positioning or placing the knife 28 at the proper elevation with respect to the ground 7, always substantially parallel to its position at any other elevation, there is provided a wheel 31 called a finder wheel mounted for rotation about a transverse axis 32. The wheel 31 is comprised of two main parts. The inner portion is a hub 33 carried by rotary bearings 34 and an outer tire 35 which conveniently has an irregular surface on a somewhat yieldable, only slightly elastomeric casing. The casing in end view is relatively flat in aspect, as particularly shown in FIGURE 2. Its flat periphery is covered with a number of individual studs 36 so as to afford a close interengagement with the irregularly protruding beet tops. The tire 35 on its sides has a number of laterally projecting radial ribs 37. As various adjacent portions of the stationary mechanism are passed by the ribs 37, they are generally swept clean of debris so that clogging does not occur. The finder wheel 31 is journalled to rotate in the outboard end of a pair of wheel arms 38 on which the wheel bearings 34 are movable fore and aft by virtue of screw adjusters 39. The parallel arms 38 are bridged and mounted to oscillate about a transverse axis 41 parallel to the axes of the various pivot pins for the parallelogram linkages. Within a wide range the wheel swings in an upward and downward direction to follow accurately the countour of the tops of the various beet plants.

Preferably, the wheel is power driven. There is normally available on the tractor a power takeoff extending from the tractor engine. This drives a drive shaft 42 revolving appropriate drive gears within a gear box 43. A sprocket shaft emerges from the gear box 43 and carries a sprocket 44 around which a chain 46 is trained. The chain 46 is also in engagement with a sprocket 47 on a shaft 48 carried in the main frame 13 on the axis 41. The shaft 48 supports the wheel arms 38 by means of bearings 49 and is also turned about the axis 41. Drive from the shaft 48 is transferred by a chain mechanism. For that reason, on the shaft 48 is mounted a sprocket 50 in engagement with a drive chain 51 itself trained around a sprocket 52 fastened to the finder wheel 31. With this arrangement, despite rising and falling movement of the wheel 31, power from the drive shaft 42 is transmitted to the finder wheel so that its rotational speed or velocity is always set or fixed with respect to the speed of advance of the tractor.

The gearing and connecting arrangements are such that the wheel 31 is rotated so that its lower periphery turns at exactly the speed of advance of the vehicle over the ground. There is no or substantially no relative linear or longitudinal motion between the lower periphery of the wheel and the beet tops. Conveniently, the wheel engages the top or far side of the beet at about the time that the knife 28 engages the near side of the beet, so that any tendency of the advancing knife to tip the beet forwardly or in the direction of advance is equally resisted and cancelled by a tendency of the wheel to drive the beet rearwardly or opposite to the direction of advance. Thus the forward pressure of the knife is largely balanced by the rearwardly directed frictional effect of the wheel 31 in riding along the beet tops.

It is preferred that the movement of the knife 28 follow and have a particular relationship to the motion of the finder wheel 31. For that reason, the parallelogram upper links 16 are extended to provide parallel arms 53 forming part of the links 16 but extending to a location just above the wheel axis 32. A block 54 is arranged to carry a cross pin 56 which pierces the arms 53. Likewise passing through the block 54 is a generally vertically extending rod 57 pivotally secured to the wheel axle 58 and centered on the axis 32. The rod 57 is movably related to the block 54 by means of a lower jam nut 59 and an upper jam nut 61. The cross pin 56 is not fixed within the extension arms 53 of the parallelogram upper links 16 but rather can be moved in arcuate slots 62 therein. Thus the radius or distance between the axis of the cross pin 56 and that of the pivot pin 18, for example, can be substantially varied. The radial distance between the wheel axis 32 and the extension arms 53 of the parallelogram upper links 16 can likewise be varied by adjusting the nuts 59 and 61.

In action, as the finder wheel 31 advances over the beet tops, it rises and falls throughout a corresponding range. The finder wheel is kept in contact with the beet tops by its own weight and by a pair of coil springs 63 at one end bearing against clevises 64 secured by pins 65 to the rearward part of the links 38. Rods 66 extend from the clevises and at the other end terminate in screw shafts 67 having stop nuts 68 thereon. Relatively long helical springs 63 engage the shoulder of the clevises 64 and also engage washers 69 on sleeves 71 loosely receiving the upper end of rods 66 at the lower end merging with the clevises 64. Arms 73 are connected by pivots 74 to the sleeves 71 and are oscillated about the center of a square shaft 76 by a detent-held hand lever 77. When the lever 77 is operated, the springs 63 are more or less compressed and exert through the clevises 64 more or less force tending to urge the wheel arms 38 downwardly. Thus the wheel is held against the upper portions of the beets with the desired pressure and despite undulations caused by the different configurations, locations and sizes of the beets.

Particularly in accordance with the invention, it is arranged that the cutting knife cut predetermined proportions from the successive beets encountered in accordance with machine setting and with the size of the beets. For example, a relatively low small beet has a relatively small slice taken from its top. The ratio of the slice sizes can be adjusted. Usually, the removed slice is large enough to remove all the foliage but small enough to leave adequate merchantable beet root material for subsequent harvest. The cross pin 56 is moved in the slots 62 toward and away from the pivot pin 18 to change the cutting position on beets of different sizes and to vary the cutting ratio.

In the operation of this mechanism, the machine is driven into a field having the beet rows therein and is so positioned that the finder wheel 31 rides along the top of each of the beets in a row. When initially encountering the row, the operator adjusts the lever 77 to give the desired down pressure on the finder wheel. The mechanism is also set with respect to the fore and aft position of the cross pin 56 as particularly illustrated in FIGURES 3 and 5 so that the cutting knife 28 cuts a predetermined distance below the contact point of the finder wheel and removes a relatively thin top or slice from the beet 6S. The amount removed from the small beet is represented by the distance 81 in FIGURE 3. With this same adjustment of the position of the pin 56, when the finder wheel subsequently encounters a much bigger beet 6L projecting higher from the ground as shown in FIGURE 4, the linkage moves so that an amount 82 is cut from the top of the beet. For this adjustment, the cut 82 takes about three times the material taken by the cut 81.

If this ratio is not satisfactory, the cross pin 56 is moved to another position in its arcuate slots 62, for example as shown in FIGURES 5 and 6. In this instance the blade is somewhat more widely spaced below the finder wheel and so, as shown in FIGURE 5, removes from the beet 6S a top slice having a thickness 83. With this adjustment when the finder wheel encounters the larger beet 6L, as shown in FIGURE 6, the linkage moves to make the knife 28 remove a top slice having a thickness 84 which is about one and one-half times the thickness 83. Thus despite the range in size of the various beets, the ratio or proportion of beet removed as a top slice can be varied both absolutely and to the desired range for the beets being harvested.

As a further adjustment, controlling generally the depth of cut of the knife, the nuts 59 and 61 can be altered in position so as to change the radial distance between the axis 32 of the wheel and the cross pin 56. This change makes an absolute alteration in the depth of cut for all circumstances.

Since under some circumstances the knife 28 operates very closely to the periphery of the finder wheel and under certain circumstances of adjustment might actually cut into the finder wheel, it is preferred to provide a stop to preclude such action. For that reason, there is clipped to the link 38 a bracket 91 which extends downwardly and rearwardly to a terminus 92 beyond the periphery of the studs 36 on the wheel 31 and in the path of the knife 28. Thus, if the linkage should draw the knife too closely toward the wheel casing, the knife first abuts the stop 92 and is precluded from cutting the soft material of the casing.

The arrangement as described is quite effective to top beets arranged generally at random within a row in the field, the finder wheel moving over the tops of the beets without substantial jouncing or bouncing, being held in position by the springs 63, and because of the adjustments 59 and 61 as well as the adjustment 56, the knife removes the desired amount of beet from the top, leaving the remainder of the beet in the field for subsequent recovery.

What is claimed is:

1. A beet topper comprising a main frame adapted to be advanced over a row of beets planted in the ground and projecting various distances thereabove, a cutting frame, a cutting knife mounted on said cutting frame, a parallelogram linkage connecting said cutting frame and said main frame, a beet-engaging wheel substantially circular cylindrical in shape and having a width substantially equal to the width of beets planted in said row and having radially extending fins projecting axially from the sides thereof to serve as sweeps to dislodge debris from adjacent relatively stationary parts of said beet topper, a link connecting said wheel to said main frame for rising and falling movement of said wheel relative to said main frame, and means for connecting said wheel to said parallelogram linkage.

References Cited

UNITED STATES PATENTS

| 1,046,198 | 12/1912 | Klemmer | 56—121.4 |
| 1,280,156 | 10/1918 | Campbell | 56—121.4 |
| 1,354,857 | 10/1920 | Smith | 56—121.4 |
| 1,805,582 | 5/1931 | Hovermale | 56—121.42 |
| 2,337,307 | 12/1943 | Beck | 56—25.4 |
| 2,340,919 | 2/1944 | Allen | 56—25.4 |
| 2,826,890 | 9/1958 | Oppel | 56—121.4 |

FOREIGN PATENTS

| 88,357 | 1/1960 | Denmark. |
| 900,411 | 7/1962 | Great Britain. |

RUSSELL R. KINSEY, *Primary Examiner.*